United States Patent [19]

Marston

[11] E Patent Number: Re. 31,934

[45] Reissued Date of Patent: Jul. 2, 1985

[54] DISPOSABLE PUTTY DISPENSER

[75] Inventor: Lloyd E. Marston, Atlanta, Ga.

[73] Assignee: Dynatron/Bondo Corporation, Atlanta, Ga.

[21] Appl. No.: 907,278

[22] Filed: May 18, 1978

Related U.S. Patent Documents

Reissue of:

[64] Patent No.: 3,957,176
Issued: May 18, 1976
Appl. No.: 297,252
Filed: Oct. 13, 1972

U.S. Applications:

[63] Continuation of Ser. No. 123,561, Mar. 12, 1971.

[51] Int. Cl.[3] ..... B67D 5/54

[52] U.S. Cl. ..... 222/181; 222/143; 222/389; 222/396

[58] Field of Search ..... 222/389, 545, 146, 181, 222/185, 143, 76, 82, 325-327, 394, 396, 397; 220/208, 306, 309, 310, 366

[56] References Cited

U.S. PATENT DOCUMENTS

| | | | |
|---|---|---|---|
| 1,497,716 | 6/1924 | Fawcett | 222/181 X |
| 1,772,379 | 8/1930 | Witt | 222/545 |
| 2,254,168 | 8/1941 | Dale | 222/143 X |
| 2,454,343 | 11/1948 | Rotter et al. | 222/82 |
| 2,593,362 | 4/1952 | Taylor | 222/389 |
| 2,955,726 | 10/1960 | Feldman et al. | 222/76 |
| 3,198,395 | 8/1965 | McKinney | 222/181 X |

OTHER PUBLICATIONS

"Marson Miser" 1969, "Hands Off Policy", Marson Corporation, 1969.

*Primary Examiner*—David A. Scherbel
*Attorney, Agent, or Firm*—George M. Thomas

[57] ABSTRACT

A putty dispenser including a disposable cylindrical container is closed after being filled with putty and not opened again until after the container has been shipped and the putty has been dispensed from the container. A separator float is positioned inside the container and separates the putty from the air in the top of the container. A dispensing spout is centered in the bottom wall of the container and an air inlet spout is located off center in the topwall of the container. A non-drip putty dispensing valve is connectable to the dispensing spout, and air pressure is supplied to the container through the air inlet spout. A support frame is provided for supporting the container in an elevated position above a table top, or on a wall, etc., where the dispensing valve beneath the container is accessible.

9 Claims, 4 Drawing Figures

DISPOSABLE PUTTY DISPENSER

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation of application Ser. No. 123,561, filed Mar. 12, 1971.

BACKGROUND OF THE INVENTION

Plastic body filler or putty such as polyester resin is usually supplied to automobile body shops, etc., in cans, and when the putty is to be used in the shop it is taken from its container in small quantities and mixed with a hardener and applied to the surface to be repaired. The lid of the container of putty frequently is removed and left off the container for prolonged time intervals. This subjects the putty to oxidation from the air and contamination from dust and airborne metallic particles, and moisture. Also, the workmen frequently inadvertently mix the hardener used with the putty with the putty in the container when they dip into the putty with a tool, etc., which has been contaminated with hardener. As a result, the putty in the container becomes contaminated with hardener and becomes hard and unusable. Moreover, even if the putty does not become contaminated, a substantial amount of usable putty is usually wasted since the putty tends to cling to the sidewalls of the container and is discarded with the container.

In addition, the type plastic body filler normally utilized in automobile body shops must be maintained at a temperature between approximately 70° and 90° F. in order to have the viscosity to be properly mixed with its hardener and to be applied evenly to the surface to be repaired. If the temperature of the plastic body filler gets lower than 70° F. the putty becomes so viscous that it will not properly mix and flow, and if the temperature reaches about 100° F., the putty begins to deteriorate. In a typical vehicle body repair shop the air temperature varies substantially, particularly in the winter months, because of the opening and closing of the doors to admit and exit vehicles from the building, etc., and the putty frequently is unusable in the winter months because of its cold environment unless the container is maintained in a warm room or near a heater.

SUMMARY OF THE INVENTION

Briefly described, the present invention comprises a putty dispensing apparatus which obviates the above-mentioned problems, and which provides a dispensing apparatus with a disposable putty container. The putty is packaged in, shipped in, and dispensed from its disposable container, and the dispensing apparatus maintains the putty in an accessible position but in a contamination-free environment. The container is inexpensive and is normally disposed of after the putty has been dispensed therefrom, and a separator float is positioned on the surface of the putty in the container and causes substantially all of the putty to be dispensed from the container. A dispensing valve is provided which substantially eliminates any hazard of contaminating the putty through its dispensing opening and which causes the putty to flow freely from the valve without having the putty drip from or cling to the dispensing apparatus.

A band heater is normally connected to the container and functions to heat the lower portion of the container and the portion of the body of putty at the lower portion of the container so that the putty at the outlet opening of the container flows freely as it is being dispensed and is dispensed at a viscosity suitable for mixing with hardener and applying to the surface to be repaired by the workmen.

Thus, it is an object of this invention to provide dispensing apparatus for dispensing a viscous putty or the like in a prescribed viscosity range and substantially without waste.

Another object of this invention is to provide a system for dispensing putty which includes a disposable container which is normally received and maintained in a closed condition at the workshop as putty is dispensed from the container.

Another object of this invention is to provide a putty container which is connectable to a dispensing system and which functions to dispense putty without opening the container and without hazard of contaminating the putty contained therein.

Other objects, features and advantages of the present invention will become apparent upon reading the following specification when taken into conjunction with the accompanying drawing.

DESCRIPTION OF A PREFERRED EMBODIMENT

Figure 1:
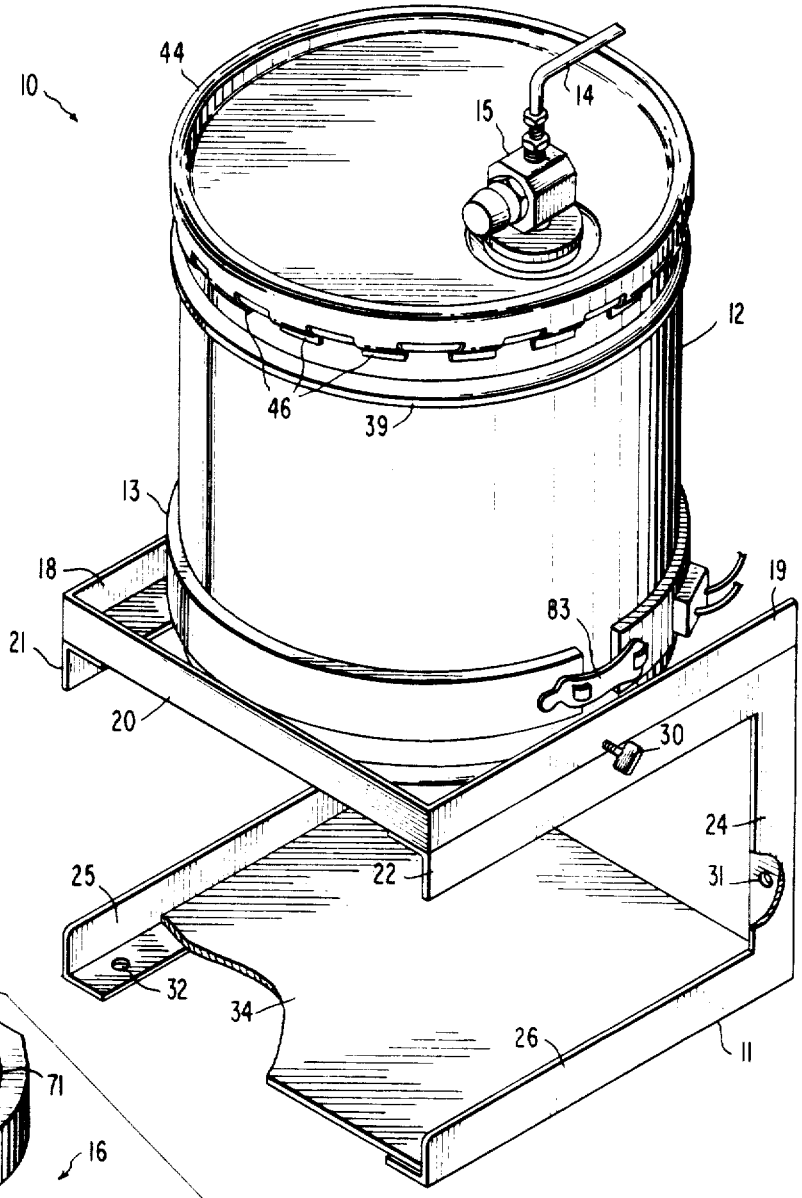
FIG. 1 is a perspective vie of the putty dispensing apparatus.
Figure 3:
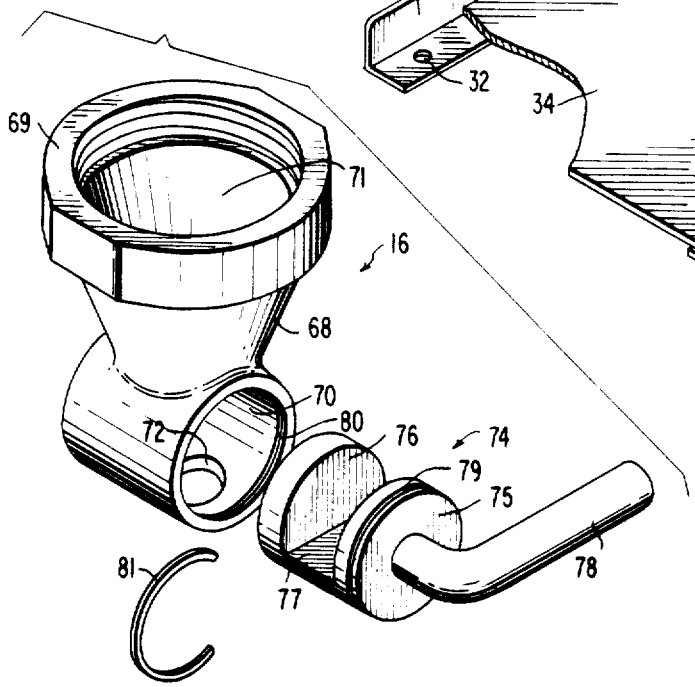
FIG. 3 is an exploded perspective view of the dispensing valve.
Figure 2:
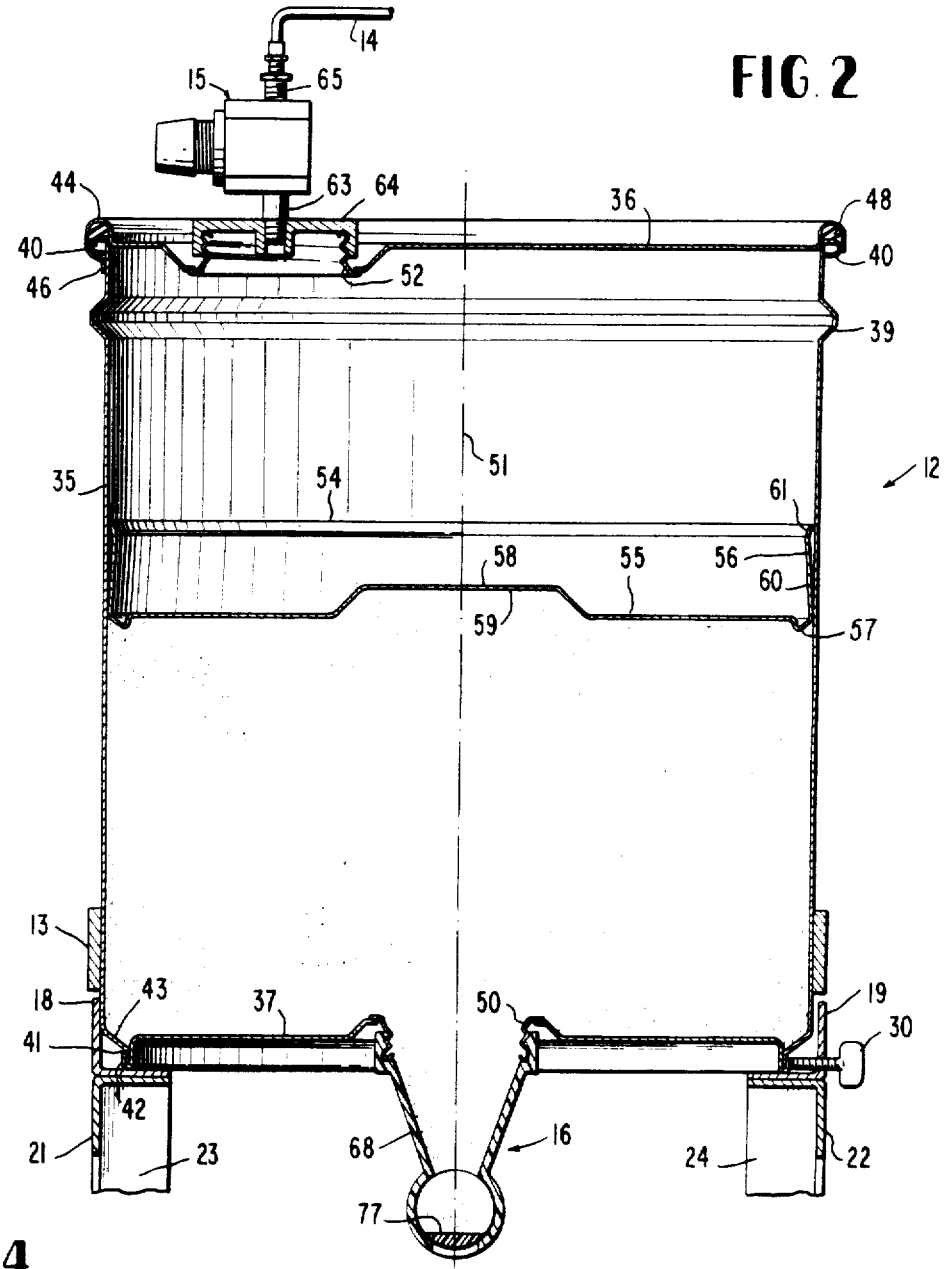
FIG. 2 is a side cross-sectional view of the putty container and related elements.

Referring now in more detail to the drawing, in which like numerals indicate like parts throughout the several views, FIG. 1 discloses putty dispensing apparatus 10 which includes support frame 11, disposable container 12, heating means 13, air inlet conduit 14, air pressure control means 15, and dispensing valve 16 (FIGS. 2 and 3).

Support frame 11 includes a pair of spaced apart horizontal container support rails 18 and 19 which are rigidly connected at one end to cross rail 20. Upper horizontal legs 21 and 22 extend along the lower portion of the support rails 18 and 19, upright legs 23 and 24 are connected at their upper ends to the rear ends of upper horizontal legs 21 and 22, and lower legs or feet 25 and 26 extend parallel to upper horizontal legs 21 and 22 and are connected at their rear ends to the lower ends of upright legs 23 and 24. The arrangement is such that the support frame is generally C-shaped in side elevation and defines an access space 28 between feet 25 and 26 and upper horizontal legs 21 and 22. Container support rails 18, 19 and 20 are L-shaped in cross-section and the lower inwardly extending horizontal spans of the L-shaped legs form a U-shaped platform upon which disposable container 12 rests. A set screw 30 is threaded through an aperture in the upright span of support rail 19 toward the rear of the support rail and the set screw is arranged to engage the lower end or chime of container 12. When the set screw is threaded through support rail 19 it engages container 12 behind its center portion and tends to wedge the container against the opposite upwardly extending span of support rail 18 and the upwardly extending span of support rail 20, causing the container to be gripped by the support rails. The L-shaped cross-sectional configuration of upright legs 23 and 24 provide strength and stability to the support frame 11, and spaced apertures 31 in the upright legs allow the support frame to be screwed or nailed to a wall or other vertical structure. The L-shaped cross-sectional configuration of lower feet 25 and 26 also provide strength and stability to the framework, and the spaced openings 32 allow the support frame to be anchored to a table top, etc., by means of screws or nails. In addition, a drip pallet 34 is supported by the horizontal spans of the L-shaped support feet 25 and 26 and is maintained in position between the feet beneath container 12 by the upright spans of the feet. Thus, any inadvertent spillage or dripping of the putty from the container will be caught by the pallet. In addition, the upright spans of the L-shaped feet 25 and 26 provide surfaces upon which the workman's mixing pallet can be placed as the workman dispenses putty from container 12.

As is illustrated in FIG. 2, container 12 includes a generally cylindrical sidewall 35 and upper and lower generally circular end walls 36 and 37. An external annular protrusion 39 is formed in sidewall 35 adjacent its upper end for strength purposes. The upper edge of sidewall 35 is rolled outwardly to form annular bead 40, while the lower edge of sidewall 35 is swaged inwardly to form smaller diameter rim 41. Bottom wall 37 is rigidly connected to lower rim 41 by annular flange or chime 42 which surrounds lower rim 41. The structure of lower rim 41 and annular flange 42 is such that an internal annular recess 43 is formed inside container 12.

The outer edge of top wall 36 is formed with an annular rim 44 that forms a groove which faces in a downward direction and is sized and shaped to extend about annular bead 40 at the upper edge of sidewall 35. A plurality of tabs or lugs 46 extend downwardly from annular rim 44 of top wall 36 and fold inwardly over annular bead 40 of sidewall 35. Sealing ring 48 is received in annular rim 44 of top wall 36 and engages the top edge of annular bead 40. When top wall 36 is connected to sidewall 35 it is pressed in a downward direction to compress sealing ring 48 and lugs 46 are folded inwardly about annular bead 40. This method of connecting top wall 36 to sidewall 35 causes a predetermined force to be applied to sealing ring 48, and the strength of lugs 46 is such that the connection of top wall 36 to sidewall 35 will withstand a predetermined force and will rupture when the internal air pressure of the container exceeds a predetermined level. When the predetermined internal pressure within container 12 is exceeded, at least one of the lugs 46 will give to allow a portion of top wall 36 to separate from sidewall 35, whereupon the air pressure within container 12 will escape about the portion of sealing ring 48 adjacent the stretched lug 46. In the meantime, the remaining lugs 46 will cause top wall 36 to stay attached to sidewall 35, so that the top wall will not "explode" or fly away from sidewall 35 and cause injury or damage to surrounding personnel or equipment.

Figure 4:
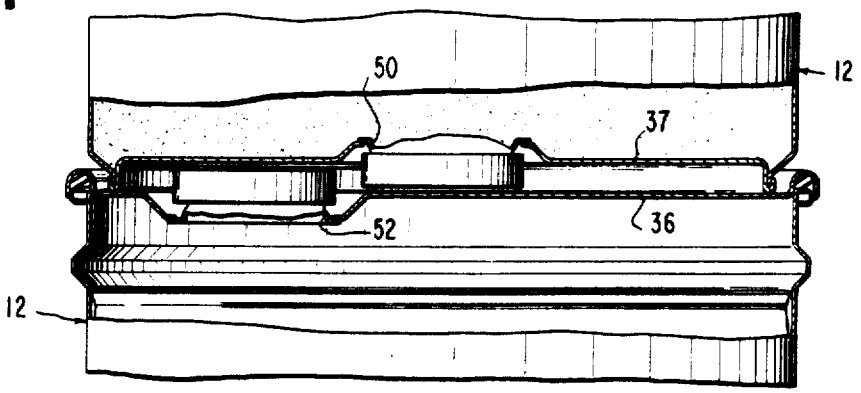
FIG. 4 is a detailed illustration of a pair of stacked disposable containers.

Annular flange 32 of bottom wall 37 forms a supporting chime for container 12 and the chime is of a diameter smaller than the diameter of annular rim 44 of top wall 36. The arrangement is such that containers 12 can be "nested" or stacked one upon the other for storage or shipment in the manner as illustrated in FIG. 4.

Bottom wall 37 includes an inwardly recessed, outwardly extending, externally threaded putty outlet spout 50 at its center portion which is at the longitudinal centerline 51 of cylindrical container 12. The outer or lower end of putty outlet spout 50 is at an elevation slightly higher than the lower edge of chime 42 and a cap normally closes the putty outlet spout. The construction is such that the container can be handled without significant hazard of damaging putty outlet spout 50 since the outlet spout is recessed above the lower annular edge of chime 42.

Top wall 36 includes an inwardly recessed, outwardly extending, externally threaded air access spout 52 which is offset to one side of longitudinal centerline 51. Air access spout 52 is normally closed with a cap and when two or more of the containers 12 are stacked or nested (FIG. 4), the putty outlet spouts 50 will always be displaced from the air access spouts 52 in the adjacent cans regardless of the manner in which the cans are oriented with respect to each other.

As is illustrated in FIG. 2, separator float 54 is located within container 12 on the top surface of the putty and includes a circular, generally flat body portion 55 and an upwardly extending annular flange 56. Body portion 55 is normally oriented parallel to top and bottom walls 36 and 37, and defines upwardly extending protrusion 58 at its center which is in alignment with the centerline 51 of container 12 and which forms a lower recess 59 over the recessed putty outlet spout 50. In addition, a downwardly extending annular protrusion 57 is formed at the junction between body portion 55 and annular flange 56. Annular protrusion 57 is sized and shaped to fit in the internal annular recess 43 at the bottom of the container and recess 59 is sized to extend about the recessed portion of putty outlet spout 50 when separator float is lowered to a position adjacent bottom wall 37. Thus, the space between separator float 54 and bottom wall 37 is reduced to a minimum when the separator float is in its full down position.

Annular flange 56 includes an upwardly and inwardly extending portion 60 and an upwardly and outwardly extending portion 61 which forms an upper wiping edge or rim juxtaposed the inside surface of sidewall 35.

Air supply conduit 14 is connected to container 12 by means of fitting 63. Fitting 63 includes internally threaded cap 64 which is threaded onto the external threads of air access spout 52, air conduit 65, and air pressure control means 15. Air pressure control means 15 comprises a spring biased pressure relief valve (not shown) arranged to relieve the air pressure from conduit 65 when the air pressure exceeds the adjustable preset limit set by the control valve. Control valves of this type are conventional, and a more detailed description of the control valve would be superfluous.

As is illustrated in FIG. 3, dispensing valve 16 comprises a valve housing 68 which includes an upper internally threaded socket 69 which is threadable unto the external threads of putty outlet spout 50, and a generally cylindrical bore 70 which has its longitudinal axis normally disposed approximately parallel to bottom wall 37 of container 12. Inlet port 71 extends from socket 69 to bore 70 and outlet port 72 extends from bore 70 to the outside of valve housing 68. Ports 71 and 72 are located on opposite sides of bore 70. Rotatable valve element 74 includes a pair of spaced apart discs 75 and 76 connected together by valve plug member 77 along a mutual arc. The side configuration of spaced discs 75 and 76 and valve plug member 77 form a generally U-shaped rotatable valve element, and L-shaped valve lever 78 is connected to disc 75 and functions as a means to rotate the valve element within valve housing 68. Disc 75 defines annular recess 79 at its perimeter while bore 70 defines a complementary annular recess 80, and C-shaped snap ring 81 is sized and shaped to fit in the annular recesses when the rotatable valve element 71 is properly positioned in valve bore 70, thus holding the valve element in its operational position within valve housing 68.

When dispensing valve 16 is properly assembled, valve plug member 77 is rotatable to a position where it plugs or blocks outlet port 72 when in its lower position, and is rotatable so that it can be moved from over outlet port 72, to open the valve. The configuration of rotatable valve element 74 is such that the material in container 12 will be in contact with all of the material in dispensing valve 16, even when the valve is closed, by having plug member 77 block outlet port 72. No material will be trapped in the valve and out of communication with the material above the valve and in the container. Thus, the moisture from the material in the container will communicate with the material in the valve and there will be virtually no hazard of the material in the valve from becoming dry and hardened. In addition, when valve element 74 is rotated between its opened and closed positions, the pressure of the putty in container 12 and in dispensing valve 16 will not inhibit or enhance the rotation of the valve element so that the valve element can be rotated to a set position and left that way without having the flow of putty or pressure in the system move the valve to a further opened or closed position. Also, when the valve is rotated from its opened position to its closed position the plug member 77 tends to have scissors effect with the edge of outlet port 72, and this results in the putty extending below the valve being cut from the valve. This cutting action tends to reduce the tendency of the putty to cling to or drip from the valve.

As is illustrated in FIGS. 1 and 2, heating means 13 comprises a band heater which is generally of circular or ring configuration and which is sized and shaped to surround container 12. A spring clip 83 allows the band heater to be expanded when being placed on and removed from a container 12, and allows the band to be drawn into firm contact with the external surface of the container when in use. This firm contact between band heater 13 and container 12 assures that the heat from the heater will be transmitted to the container by conduction. The band heater 13 is a 40 watt, 110 volt a/c heater which includes a series of high resistance conductors (not shown) extending back and forth within the band housing. The heater is constructed so that under normal conditions it will heat container 12 so that the putty inside the container will be maintained in a temperature range between 70° to 90° F. and the band heater 13 usually is placed at the lower portion of container 12 so that the heat transferred to the container will be effective to heat the putty in the lower portion of the container. Of course, a substantial amount of the heat will be transferred to the upper regions of the container and the putty within the container; however, it is normally necessary to heat only the putty adjacent putty outlet spout 50 to properly dispense the putty from the container. As the level of putty within the container is reduced, the putty adjacent separator float 54 will eventually move into the heated region of the container, so that all of the putty will be heated by band heater 13 prior to being dispensed from container 12.

Band heater 13 normally will be in constant use in the winter months in locations where the putty is to be dispensed in an environment with fluctuating temperatures or with consistently low temperatures. In the summer months, band heater 13 can be unplugged or removed from the disposable container 12 if the air temperature about the container is above 70° F.

OPERATION

Containers 12 will normally be filled on an assembly line basis, with the lower portion of each container being moved beneath a dispensing apparatus which dispenses the plastic body filler or putty into the container. The top walls or lids of the containers are later placed on top of the containers, pressed in a downward direction with a predetermined force, and the lugs or tabs 46 are bent inwardly into contact with the side portions of the container around upper annular bead 40 at the top of the sidewall of the container. Sealing ring 48 seats upon annular rim 44 of top wall 36 and functions to seal the container. The caps on putty outlet spout 50 and air access spout 52 cause the container to be maintained in a closed condition during storage and shipment.

When it is desired to dispense putty from a container 12, the cap is removed from the putty outlet spout 50 of the container, and dispensing valve 16 is threaded onto the external threads of the outlet spout. The container is then placed upon the support frame 11 and clamped in place by threading set screw 30 into contact with chime 42 at the bottom of the container. Band heater 13 is placed about the lower portion of the container and latched in place by means of spring latch 33. Band heater is then plugged into a conventional 110 volt a/c service outlet and functions to heat the lower portion of the container and the putty within its portion of the container. The cap is removed from air access spout 52, and fitting 63 is threaded onto the threads of the spout. Air pressure from a source (not shown) communicates through air inlet conduit 14. Air pressure control means 15 is adjusted so that the pressure of the air received in container 12 does not exceed the desired level. Normally, the air pressure in container 12 will be maintained at about 8 pounds per square inch. Of course, the upper limit of the air pressure as controlled by air pressure control means 15 can be varied as is desired and as is consistent with the viscosity of the material being dispensed from container 12.

In the event that the air pressure within container 12 is allowed to exceed the upper limit set by air pressure control means 15 and exceeds the rupturing pressure of top wall 36, one or more of the lugs 46 of top wall 36 will be stretched so as to allow a portion of the top wall to move away from the container, and an air passage will be formed about the portion of sealing ring 48 adjacent the one or more stretched lugs 46, and this will function to relieve the air pressure within container 12. The remaining lugs 46 normally will keep the top wall 36 from flying off or "exploding" away from the container.

After the container has been charged with air pressure, dispensing valve 16 can be operated to dispense putty from the container. Rotatable valve element 74 is rotated to remove valve plug member 77 from blocking outlet port 72, and the putty will be urged from the container. When the valve element is rotated back to its closed position, valve plug member 77 functions as a knife with respect to outlet port 72 and tends to cut off the putty extending in a downward direction from the dispensing valve and the putty will not tend to cling to the valve.

As the putty is dispensed from the container, separator float 54 will migrate in a downward direction with the surface of the putty in the container. Separator float 54 always rests upon or floats on the top surface of the putty, and functions to separate the air from the putty within the container. This tends to keep the top surface of the putty from oxidizing or forming a crust for a prolonged time interval. Moreover, if any debris, etc., happens to enter air access spout 52 when fitting 63 was being threaded onto the air access spout, the debris falls into the concave or dished portion of separator float 54 and would not be likely to contact the putty within the container.

As separator float 54 moves in a downward direction within container 12, it maintains the upper surface of the putty level and its annular flange 56 tends to wipe the putty from the sides of the container. The outwardly and upwardly extending rim 61 of the flange normally engages the inside surface of the container, so that if any putty clings to the inside surface of the sidewall of the container after the annular protrusion 59 of the separator float moves below the clinging putty, the rim 61 will tend to wipe the putty from the sidewall. Separator float 54 is fabricated from a flexible material, and the float frequently tends to expand in an outward direction into contact with the inside surfaces of the sidewall 35. This outward expansion tends to enhance the wiping function of the float.

As the separator float moves into abutment with bottom wall 37, its outer annular protrusion 57 will be received in the internal annular recess 43 at the junction of bottom wall 37 and sidewall 35 while its recess 59 will tend to mate with the internal recessed portion of putty outlet spout 50. Thus, virtually all of the putty in container 12 will be dispensed from the container by the time separator float 54 contacts bottom wall 37. Moreover, the flexibility of separator float 54 is such that if portions of the separator float do not exactly conform to the configuration of bottom wall 37, the pressure above the float will tend to deform the separator float 54 to some extent so that the separator float assumes the configuration of the bottom wall. This deformation further tends to urge the putty from the container. In addition, when separator float 54 abuts bottom wall 37, any air pressure that tends to seep around the edges of separator float 54 will function to further dispense putty from the space between separator float 54 and bottom wall 37.

When the putty has been dispensed from container 12, fitting 63 and dispensing valve 16 are removed from the container, set secre 30 is loosened, heating means 13 is removed, and container 12 is then disposed of. Container 12 is usually fabricated of metal, the sidewall 35 being fabricated of 24 gauge sheet metal and the top and bottom walls 36 and 37 being fabricated of 20 gauge sheet metal. The strengths of these metals are sufficient to withstand the internal pressure required to perform the dispensing function and to meet the requirement for interstate shipment without requiring an outer protective container. In addition, the nesting features of the containers, of putty outlet spouts with respect to air access spouts and of chime 42 with respect to the annular rim of top wall 36 as illustrated in FIG. 4, allows the disposable containers to be safely shipped, stored and handled without substantial hazard of damaging the container. Thus, the container is its own shipping carton, and after the putty shipped in the container has been dispensed, the container can be disposed of.

While this invention has been described in detail with particular reference to preferred embodiments thereof, it will be understood that variations and modifications can be effected within the spirit and scope of the invention as described hereinbefore and as defined in the appended claims.

I claim:

1. A dispensing apparatus for dispensing viscous putty or the like comprising a normally closed substantially cylindrical upright disposable metal container with a top wall and a bottom wall and a curved side wall, a body of putty or the like normally filling said container from its bottom wall toward its top wall, a disposable follower inside said container comprising a generally flat body portion normally disposed approximately parallel to said top and bottom walls and normally resting on the top surface of the putty in the container and an annular flange extending upwardly from the edge of said body portion adjacent the inside surface of said curved side wall, said top wall defining an air inlet opening therein, a source of air pressure communicating with said air inlet opening, pressure control means for controlling the air pressure in said container, said bottom wall defining a putty discharge opening therein, a putty dispensing valve connected to said putty discharge opening for controlling the dispensing of putty from said container, said top wall being connected to said curved side wall by a plurality of spaced deformable lugs extending from the edge of said top wall and frictionally engaging the external surface of said curved side wall of said container with a connection that permits one or more of said lugs to deform and allow a portion of said top wall to move away from said curved side wall while the remaining lugs hold said top wall on said curved side wall upon an excessive air pressure being present in said container, thus forming an air passage between said top wall and said curved side wall of said container at the deformed lugs to relieve the excessive air pressure in the container without permitting said top wall to be removed from said curved side wall, said air inlet opening and said putty discharge opening in said top and bottom walls being offset from each other with one of said openings being positioned at the longitudinal centerline of the cylindrical container and the other of said opening being offset from the longitudinal centerline of the cylindrical container, and closure caps for closing said air inlet opening and said putty discharge opening, a container support frame including container support rails normally oriented in a horizontal attitude and arranged to support said container with said dispensing valve protruding below said container support rails, upwardly extending legs connected to and extending downwardly from said container support rails, and lower feet positioned below said container support rails and connected to said upright legs, whereby putty is packaged and shipped in said container, the container is placed on its container support frame in an elevated position so the putty dispensing valve will be suspended between the support rails and the lower feet of the container support frame, the closure caps are removed from the air inlet opening and the putty discharge opening, the putty dispensing valve is connected to the putty discharge opening in the bottom wall and a source of air pressure and the pressure control means are connected to the air inlet opening in the top wall, and substantially all of the putty is dispensed from the container by opening and closing the dispensing valve without removing the top wall from the container, and one or more of the deformable lugs of said top wall will deform when a predetermined pressure is exceeded in the container to form an air passage between the top wall and the side wall of the container above the body of putty at the deformed lugs to relieve the excessive air pressure in the container without permitting the top wall to be removed from the curved side wall.

2. A dispensing apparatus for dispensing viscous putty or the like comprising a normally closed substantially cylindrical upright disposable metal container with a top wall and a bottom wall and a curved side wall, a body of putty or the like normally filling said container from its bottom wall toward its top wall, a disposable follower inside said container comprising a generally flat body portion normally disposed approximately parallel to said top and bottom walls and normally resting on the top surface of the putty in the container and an annular flange extending upwardly from the edge of said body portion adjacent the inside surface of said curved side wall, said top wall defining an air inlet opening therein, a source of air pressure communicating with said air inlet opening, pressure control means for controlling the air pressure in said container, said bottom wall defining a putty discharge opening therein, a putty dispensing valve connected to said putty discharge opening for controlling the dispensing of putty from said container, support means for supporting said container in an elevated position whereby the putty can be dispensed through said putty dispensing valve to a space below the container, said top wall being connected to said curved side wall by a plurality of spaced deformable lugs extending from the edge of said top wall and frictionally engaging the external surface of said curved side wall of said container with a connection that permits one or more of said lugs to deform and allow a portion of said top wall to move away from said curved side wall while the remaining lugs hold said top wall on said curved side wall upon an excessive air pressure being present in said container, thus forming an air exhaust passage between said top wall and said curved side wall of said container at the deformed lugs to relieve the excessive air pressure in the container without permitting said top wall to be removed from said curved side wall, whereby putty is packaged and shipped in said container, the container is placed on its support means, the putty dispensing valve is connected to the putty discharge opening in the bottom wall and a source of air pressure and the pressure control means are connected to the air inlet opening in the top wall, and substantially all of the putty is dispensed from the container by opening and closing the dispensing valve without removing the top wall from the container, and one or more of the deformable lugs of said top wall will deform when a predetermined pressure is exceeded in the container to form an air passage between the top wall and the side wall of the container above the body of putty in the container at the deformed lugs to relieve the excessive air pressure in the container without permitting the top wall to be removed from the curved side wall.

3. The dispensing apparatus of claim 2 and wherein said dispensing valve comprises a valve housing defining a generally cylindrical bore with its longitudinal aixs disposed approximately parallel to said bottom wall, an inlet port in its upper portion extending between said container and said valve bore and an outlet port in its lower portion across from said inlet port, a rotatable valve element in said cylindrical bore and including a plug member rotatable between a valve-open position where the plug is positioned beside said outlet port and both said inlet port and said outlet port are open and a valve-close position where the plug is positioned over said outlet port and said inlet port is open and said outlet port is closed.

4. A dispensing apparatus for dispensing viscous putty or the like comprising a normally closed substantially cylindrical upright disposable metal container with a top wall and a bottom wall and a curved side wall, a body of putty or the like normally filling said container from its bottom wall toward its top wall, a disposable follower inside said container comprising a generally flat body portion normally disposed approximately parallel to said top and bottom walls and normally resting on the top surface of the putty in the container, said top wall defining an air inlet opening therein for communicating with a source of air pressure, said bottom wall defining a putty discharge opening therein for connection to a putty dispensing valve or the like, said top wall being connected to said curved side wall by a plurality of spaced deformable lugs extending from the edge of said top wall and frictionally engaging the external surface of said curved side wall of said container with a connection that permits one or more of said lugs to deform and allow a portion of said top wall to move away from said curved side wall while the remaining lugs hold said top wall on said curved side wall upon an excessive air pressure being present in said container and thus forming an air exhaust passage between said top wall and said curved side wall of said container at the deformed lugs to relieve the excessive air pressure in the container at a level above the putty in the container normally without permitting said top wall to be removed from said curved side wall, whereby putty is packaged and shipped in said container, a putty dispensing valve is connected to the putty discharge opening in the bottom wall and the container is charged with air pressure through the air inlet opening in the top wall, and substantially all of the putty is dispensed from the container by opening and closing the dispensing valve without removing the top wall from the container.

5. A dispensing apparatus for dispensing viscous putty or the like comprising a normally closed substantially cylindrical upright disposable container with a top wall and a bottom wall and a curved side wall, a body of putty or the like normally filling said container from its bottom wall toward its top wall, a disposable follower inside said container comprising a body portion normally disposed approximately parallel to said top and bottom walls and normally resting on the top surface of the putty in the container and an annular flange extending upwardly from the edge of said body portion adjacent the inside surface of said curved side wall, said top wall defining an air inlet opening therein for communication with a source of air pressure, said bottom wall defining a putty discharge opening therein for connection to a putty dispensing valve, said top wall being connected to said curved side wall by a plurality of spaced deformable lugs extending from the edge of said top wall and frictionally engaging the external surface of said curved side wall of said container with a connection that permits one or more of said lugs to deform and allow a portion of said top wall to move away from said curved side wall while the remaining lugs hold said top wall on said curved side wall upon an excessive air pressure being present in said container, thus forming an air exhaust passage between said top wall and said curved side wall of said container at the deformed lugs to relieve the excessive air pressure in the container without permitting said top wall to be removed from said curved side wall, and support means comprising a container support frame including a pair of spaced parallel container support rails normally oriented in a horizontal attitude and arranged to support said container with a dispensing valve protruding below said container support rails, a pair of normally upright legs connected to and extending downwardly from said container support legs, and a pair of lower feet positioned below and parallel to said container support legs and connected to said upright legs, whereby putty is packaged and shipped in said container, the container is placed on its support means, a putty dispensing valve is connected to the putty discharge opening in the bottom wall and a source of air pressure is connected to the air inlet opening in the top wall, and substantially all of the putty is dispensed from the container by opening and closing the dispensing valve without removing the top wall from the container, and one or more of the deformable lugs of said top wall will deform when a predetermined pressure is exceeded in the container to form an air passage between the top wall and the side wall of the container above the body of putty in the container at the deformed lugs to relieve the excessive air pressure in the container without permitting the top wall to be removed from the curved side wall.

6. A dispensing apparatus comprising in combination, a disposable metal cylindrical container including a curved side wall, a top wall and a bottom wall, a body of putty or the like filling said container from said bottom wall toward said top wall, a source of air pressure communicating with said container through said top wall, a disposable follower inside said container normally resting on the top surface of the putty in the container, a putty dispensing valve communicating with said container through said bottom wall and protruding in a downward direction from said bottom wall beneath said container, a support means for supporting said container in an elevated position from a horizontal surface whereby the putty can be dispensed through said putty dispensing valve to a space below said container and above the horizontal surface, said top wall being connected to said curved side wall with a plurality of spaced apart deformable lugs extending from the periphery of said top wall and folded about an annular rim at the upper end of said curved side wall *with a connection that permits one or more of said lugs to deform while the remaining lugs hold said top wall on said curved sidewall* for forming an air release passage in said container above the level of the putty in said container in response to the air pressure in said container exceeding a predetermined amount whereby air in said container is discharged therefrom.

7. The dispensing apparatus of claim 6 and wherein said support means comprises means for supporting said container from a horizontal surface and from a vertical surface.

8. A dispensing apparatus comprising in combination, a disposable cylindrical container including a bottom wall, *an opening in said bottom wall for connection to a putty dispensing valve*, a curved side wall extending upwardly from said bottom wall with an annular rim about its top, a top wall [including a plurality of deformable lugs extending from the periphery of the top wall and folded about the annular rim of said side wall], *an opening in said top wall for communication with a source of air pressure, a sealing ring positioned between said top wall and the annular rim of said curved side wall to seal the top wall of the side wall*, a body of putty or the like filling said container from said bottom wall toward said top wall, [an opening in said top wall for communication with a source of air pressure.] a disposable follower inside said container normally resting on the top surface of the putty in the container *adjacent the top wall of the container and including a body portion with a bottom surface conforming in shape to the bottom wall of said container and an annular flange extending upwardly from said body portion for engaging the inside surface of said curved side wall, said top wall being connected to said curved side wall with a plurality of spaced apart deformable lugs extending from the periphery of said top wall and folded about said annular rim and forming a connection between said top wall and said cylindrical side wall which closes the container until the pressure in the container exceeds a predetermined level whereupon one or more of the lugs stretches to form an air release passage between said side wall and said top wall while the remaining lugs hold said top wall on said curved sidewall*, [and an opening in said bottom wall for connection to a putty dispensing valve] *whereby a putty dispensing valve is connected to the opening in the bottom wall and a source of air pressure is connected to the opening in the top wall of the container and the air pressure over the follower is increased to dispense the putty out of the opening in the bottom wall when the putty dispensing valve is opened* .

9. A dispensing apparatus comprising a disposable cylindrical container including a curved side wall, a top wall and a bottom wall, a body of putty or the like filling said container from said bottom wall toward said top wall, an opening in said top wall for communication with a source of air pressure, a disposable follower inside said container normally resting on the top surface of the putty in the container, and an opening in said bottom wall for connection to a putty dispensing valve, said curved side wall including an annular rim extending about its upper portion, and said top wall including a plurality of spaced apart deformable lugs extending from its periphery and folded about the annular rim at the upper portion of said curved side wall *with a connection that permits one or more of said lugs to deform and allow a portion of said top wall to move away from said curved sidewall while the remaining lugs hold said top wall on said curved sidewall* , [whereby the lugs of the top wall are deformable] in response to excessive pressure in the container for forming an air release passage in said container above the level of the disposable follower and the putty and said container in response to excessive pressure in said container.

* * * * *